United States Patent [19]

Wolfe, Jr.

[11] Patent Number: 4,981,908
[45] Date of Patent: Jan. 1, 1991

[54] THERMOPLASTIC ELASTOMER BLENDS

[75] Inventor: James R. Wolfe, Jr., Wilmington, Del.

[73] Assignee: E. I. Du Pont De Nemours and Company, Wilmington, Del.

[21] Appl. No.: 151,581

[22] Filed: Feb. 2, 1988

[51] Int. Cl.$^5$ .................. C08L 53/00; C08L 67/02
[52] U.S. Cl. ................................ 525/92; 525/173; 525/174
[58] Field of Search .................. 525/92, 173, 174

[56] References Cited

U.S. PATENT DOCUMENTS 4,275,180 6/1981 Clarke ........................ 527/173
4,629,761 12/1986 Wolfe, Jr. .................... 525/92

FOREIGN PATENT DOCUMENTS

WO86/04913 8/1986 PCT Int'l Appl. .......... 525/92

Primary Examiner—Marion C. McCamish
Assistant Examiner—Susan Berman

[57] ABSTRACT

Blends of 20–99 parts by weight of a multi-block copolyester thermoplastic elastomer melting above 100° C. with 80–1 parts by weight of a polyacrylate elastomer.

11 Claims, No Drawings

THERMOPLASTIC ELASTOMER BLENDS

BACKGROUND OF THE INVENTION

For many applications, for example in gaskets, seals and tubing employed in the petroleum industry or in proximity to internal combustion engines, there is a need for economical elastomeric materials with a low degree of swell when exposed at elevated temperatures to low aniline point oils similar to ASTM #3 oil. For gaskets and seals there is a particular need for oil-resistant elastomeric materials which are low in hardness and resistant to compression set.

PRIOR ART

Copolyester elastomers are thermoplastic polymers which are easily processed but they lack the desired combination of low hardness and good resistance to compression set.

U.S. Pat. No. 4,275,180 discloses blends of segmented polyetherester elastomers with ethylene/alkyl acrylate ester copolymer elastomers. The compositions of said patent, although having low oil swells in ASTM #2 oil, have much higher oil swells when tested under the more severe conditions employing ASTM #3 oil. Indeed the blends of the segmented polyetherester elastomers with ethylene/alkyl acrylate ester copolymer elastomers exhibit much higher volume swells in ASTM #3 oil than does the segmented polyetherester elastomer by itself. Furthermore, when prepared and crosslinked by the methods of said patent the blends are not thermoplastic so that scrap material cannot be reprocessed thereby increasing the cost of using these blends.

U.S. Pat. No. 4,629,761 discloses blends of a multi-block copolyester elastomer and crosslinked chlorosulfonated elastomer. Although thermoplastic such blends exhibit volume swells in ASTM #3 oil at 100° C. exceeding 30% and are limited by the thermal instability of chlorosulfonated polyethylene to multi-block copolyester elastomers melting no higher than 200° C.

SUMMARY OF THE INVENTION

It is an object of the present invention to provide soft, elastomeric thermoplastic materials which provide excellent resistance to oil swell and good resistance to compression set. We have found that this object is achieved by compositions comprising a blend of 20–99 parts by weight of multi-block copolyester elastomer melting above 100° C. and 80–1 parts by weight of polyacrylate elastomer. The multi-block copolyester elastomer consists essentially of (A) repeating high melting point blocks comprising repeating short chain ester units having the formula:

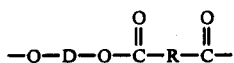

wherein D is a divalent radical remaining after removal of hydroxyl groups from a low molecular weight diol having a molecular weight not greater than 250 and R is a divalent radical remaining after the removal of carboxyl groups from a dicarboxylic acid having a molecular weight not greater than 300, D and R being selected so that a polymer which consists essentially of short-chain ester units having a number average molecular weight of at least 5000 has a melting point above 100° C., (B) repeating low melting point blocks which are derived from compounds containing two hydroxyl or carboxyl groups or mixtures thereof and has a number average molecular weight of 400–4000 and a melting point not greater than 100° C., preferably not greater than 75° C., and (C) an amount of difunctional radicals sufficient to join repeating blocks of (A) and (B) to form a multi-block copolyester elastomer, the weight ratio of (A) to (B) being from about 1:4 to 1:0.1.

The polyacrylate elastomers are copolymers having two major components: the reactive cure site, comprising 1–5% of the polymer; and the backbone, comprising 95–99% of the polymer. The backbone is made from monomeric acid esters to form repeating units of primarily two types:

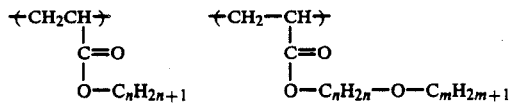

where n is 2 or 4 and m is 1 or 2.

The thermoplastic elastomer compositions can be prepared by mixing and shearing uncured polyacrylate elastomer with molten multi-block copolyester elastomer, preferably in a high-shear mixer. During the mixing operation, cross-linking agents can be added if so desired to cross-link the polyacrylate elastomer.

DETAILED DESCRIPTION

Multi-block copolyester thermoplastic elastomer, 20–99 parts, is mixed with polyacrylate elastomer, 80–1 parts. The mixing operation is carried out at or above the softening temperature of the multi-block copolyester elastomer. During the mixing operation, cross-linking agents can be added if so desired to cross-link the polyacrylate elastomer. If cross-linking agents are added, the polymer mixture is maintained at temperatures high enough to cross-link the polyacrylate elastomer while it is being masticated. Various additives such as mineral fillers, carbon blacks, plasticizers, antioxidants, processing aids, etc., can be present during preparation of the polymer mixture or can be incorporated after preparation of the mixture. If no cross-linking agents are added, the preferred compositions range is about 70–99 parts of multi-block copolyester elastomer and about 30–1 parts of polyacrylate elastomer. If cross-linking agents are added, the preferred composition range is about 30–70 parts of polyetherester elastomer and about 70–30 parts of polyacrylate elastomer.

The thermoplastic multi-block elastomers used as a component in this invention consist essentially of repeating blocks of repeating short chain ester units, as described above which have high melting points (above 100° C.) and repeating low melting point blocks (not greater than 100° C., preferably below 75° C.) which are derived from difunctional compounds having a number average molecular weight of about 400–4000. The low melting point and high melting point blocks are joined together by difunctional radicals which, for example, can be derived by reaction of the high or low melting point blocks with diols, diesters, dicarboxylic acids, diepoxides, bis(acyl lactams) and diisocyanates. The high melting point blocks crystallize at useful service temperatures to provide physical crosslinks in the multi-block elastomer while the low melting point blocks provide elastomer characteristics. At processing temperatures, generally of the order of about 100°–280°

C., preferably 140°–250 C., the high melting point blocks melt and the polymer is molten.

The high melting point blocks which comprise repeating short chain ester units of the formula

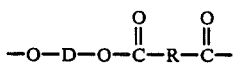

are derived from one or more low molecular weight diols, HODOH, having a molecular weight not greater than 250 and one or more dicarboxylic acids, HOOCR-COOH, having a molecular weight of not greater than 300.

The term "low molecular weight diols" as used herein should be construed to include equivalent ester-forming derivatives; provided, however, that the molecular weight requirement pertains to the diol only and not to its derivatives.

Aliphatic or cycloaliphatic diols with 2–15 carbon atoms are preferred, such as ethylene, propylene, tetramethylene, pentamethylene, 2,2-dimethyltrimethylene, hexamethylene and decamethylene glycols, dihydroxy cyclohexane and cyclohexane dimethanol. Unsaturated diols such as butene-2-diol-1,4 can also be used, particularly in minor amounts in admixture with a saturated diol.

The term "dicarboxylic acids" as used herein, includes equivalents of dicarboxylic acids having two functional carboxyl groups which perform substantially like dicarboxylic acids in reaction with glycols and diols in forming multi-block copolyester elastomers. These equivalents include esters and ester-forming derivatives, such as acid anhydrides. The molecular weight requirement pertains to the acid and not to its equivalent ester or ester-forming derivatives.

Among the aromatic dicarboxylic acids for preparing the copolyester elastomers that are used, those with 8–16 carbon atoms are preferred, particularly the phenylene dicarboxylic acids, i.e., phthalic, terephthalic and isophthalic acids and their dimethyl esters.

The diol and dicaroxylic acid must be chosen to provide a melting point of at least 100° C. for a polymer having a number average molecular weight of at least 5000 and which is derived exclusively from short chain ester units. Preferred high melting point blocks are derived from ethylene glycol, 1,4-butanediol or hexanediol by reaction with terephthalic acid alone or in admixture with up to about 30% by weight isophthalic acid or phthalic acid or mixtures thereof. Polymers based solely or principally on 1,4-butanediol are especially preferred.

The low melting point blocks in said multi-block copolyester elastomers can be provided by a variety of difunctional compounds having number average molecular weights of 400–4000 which contain hydroxyl groups or carboxyl groups or mixtures thereof. Suitable compounds for forming low melting point blocks include poly(alkylene oxide) glycols, low melting point polyester glycols and hydrocarbon glycols or diacids.

Representative poly(alkylene oxide) glycols have a carbon-to-oxygen atomic ratio of about 2.0–4.3 and a number average molecular weight of about 400–4000 and include poly(ethylene oxide) glycol, poly(1,2- and 1,3-propylene oxide) glycol, poly(tetramethylene oxide) glycol, random or block copolymers of ethylene oxide and 1,2-propylene oxide, and random or block copolymers of tetrahydrofuran with minor amounts of a second monomer such as ethylene oxide. Preferred poly(alkylene oxide) glycols include poly(tetramethylene oxide) glycol having a number average molecular weight of 600–2000, especially 800–1200, and ethylene oxide-capped poly(propylene oxide) glycol having a number average molecular weight of 1500–2800 and an ethylene oxide content of 15–35% by weight.

The required low melting point blocks (i.e., not greater than about 100° C., and preferaby below about 75.C.) from polyester glycols are either polylactones or the reaction products of low molecular weight diols (i.e., less than about 250) and aliphatic dicarboxylic acids. Representative low melting point polyester glycols are obtained by reaction of diols such as ethylene glycol, 1,4-butanediol, pentanediol, hexanediol, 2,2-dimethyl-1,3-propanediol and mixtures of ethylene glycol and propylene glycol with diacids such as adipic acid, glutaric acid, pimelic acid, suberic acid and isosebacic acid. Polylactone glycols derived from unsubstituted and substituted caprolactone or butyrolactone are also useful as low melting point polyester glycols. Preferred polyester glycols include polycaprolactone glycol and poly(tetramethylene adipate) glycol having number average molecular weights of 800–2500.

Representative hydrocarbon glycols or diacid derivatives which can be used to provide low melting point blocks include polybutadiene or polyisoprene glycols and saturated hydrogenation products of these materials. Dicarboxylic acids formed by oxidation of polyisobutylene/diene copolymers are also useful materials. Dimer acid, particularly the more highly refined grades, is a useful hydrocarbon diacid which can be used alone or in combination with other low melting point compounds such as the poly(alkylene oxide) glycols to provide low melting point blocks.

The multi-block copolyester elastomers describe herein can be made by procedures known in the art. Elastomers in which the low melting point blocks are provided by poly(alkylene oxide) glycols or hydrocarbon glycols or diacids are readily made by ester interchange reactions followed by polycondensation. Different procedures are required when the low melting point block is provided by a polyester glycol because ester exchange can take place with the high melting point ester blocks which ultimately destroys the blockiness of the polymer.

A typical procedure for preparing elastomers by ester interchange involves heating a dicarboxylic acid or its methyl ester with a poly(alkylene oxide) glycol or hydrocarbon glycol or diacid or mixtures thereof and a molar excess of low molecular weight diol in the presence of a catalyst at about 150°–260° C. and a pressure of 0.05 to 0.5 MPa, usually ambient pressure, while distilling off water formed by esterification and/or methanol formed by ester interchange. The glycol or the diacid that provides the low melting point blocks is incorporated into the polymer through difunctional radicals provided by the dicarboxylic acid in the case of the glycols, or by the low molecular weight diols in the case of the diacids. The particular amount of difunctional radicals incorporated into the polymer to join the high and low melting point blocks will vary and depends on the molecular weights and the ratio of the high and low melting point blocks and the functional groups on the blocks. However, in all cases the difunctional radicals constitute a minor amount of the total weight of the polymer.

Depending on temperature, catalyst, glycol excess and equipment, this reaction can be completed within a few minutes, e.g., about two minutes, to a few hours, e.g., about two hours. This procedure results in the preparation of a low molecular weight prepolymer which can be carried to a high molecular weight multiblock elastomer by distillation of the excess of short-chain diol. This second process stage is known as "polycondensation".

Additional ester interchange occurs during this polycondensation which serves to increase the molecular weight of the polymer. Best results are usually obtained if this final distillation or polycondensation is run at less than about 670 Pa, preferably less than about 250 Pa, and about 200°-280° C., preferably about 220°-260° C., for less than about two hours, e.g., about 0.5 to 1.5 hours. It is customary to employ a catalyst while carrying out ester interchange reactions. While a wide variety of catalysts can be employed, organic titanates such as tetrabutyl titanate used alone or in combination with magnesium or calcium acetates are preferred. The catalyst should be present in an amount of about 0.005 to 2.0% percent by weight based on total reactants.

Both batch and continuous methods can be used for any stage of polymer preparation. Polycondensation of prepolymer can also be accomplished in the solid phase by heating divided solid prepolymer in a vacuum or in a stream of inert gas to remove liberated low molecular weight diol.

Several procedures have been used to prepare multiblock copolyester elastomers wherein the low melting point blocks are polyesters as well as the high melting point blocks. One procedure involves carrying out a limited ester interchange reaction in the presence of an exchange catalyst between two high molecular weight polymers such as poly(butylene terephthalate) and poly(butylene adipate). Ester exchange at first causes the introduction of blocks of one polymer into the other polyester chain and vice versa. When the desired multi-block polymer structure is formed, the catalyst is deactivated to prevent further interchange which ultimately would lead to a random copolyester without any blockiness. This procedure is described in detail in U.S. Pat. No. 4,031,165 to Saiki et al. Other useful procedures involve coupling of preformed blocks of high and low melting point polyester glycols. Coupling can be accomplished by reaction of a mixture of the blocks with a diisocyanate, as described in European Patent No. 0013461 to Huntjens et al. Coupling can also be accomplished by heating the mixed blocks in the presence of terephthaloyl or isophthaloyl bis-caprolactam addition compounds. The caprolactam addition compounds react readily with the terminal hydroxyl groups of the polyester blocks joining the blocks. This coupling method is described in Japanese Patent No. 700740 (Japanese Patent Publication No. 73/4115). Another procedure of use when the low melting blocks are to be provided by polycaprolactone involves reacting a preformed high melting point block terminated with hydroxyl groups with epsilon-caprolactone in the presence of a catalyst such as dibutyl tin dilaurate. The caprolactone polymerized on the hydroxyl groups of the high melting point ester block which groups serve as initiators. The resulting product is a relatively low molecular weight triblock polymer having the high melting point block in the middle with low melting point polycaprolactone blocks on each end. The triblock polymer is hydroxyl terminated and may be joined to give a finished product by reaction with diepoxide such as diethylene glycol diglycidyl ether, (see, for example, Japanese Patent Publication No. 83/162654).

The mixing of the thermoplastic multi-block copolyester elastomers with the polyacrylate elastomers is accomplished by any one of a number of conventional techniques, for example in an internal mixer such as a Banbury mixer, two-roll mill, or twin-screw extruder. This mixing is done at a temperature high enough to soften the polymers for adequate mixing, but not so high as to degrade the polymers. Generally, mixing is done at a temperature range from about 100°-280° C., preferably 140°-250° C. If crosslinking agents are added to crosslink the polyacrylate elastomer, mixing is carried out for a time sufficient to allow for crosslinking of the polyacrylate elastomer and for shearing and dispersing the crosslinked polyacrylate elastomer substantially uniformly throughout the copolyester. Adequacy of mixing can be determined by observing the processability of the compositions by means of a piston rheometer. If the degree of mixing is inadequate as indicated by poor extrudability at processing temperatures, additional mixing at the original mixing temperature or at lower temperatures can be employed to further comminute and disperse the crosslinked polyacrylate in the multi-block copolyester elastomer in order to obtain satisfactory thermoplastic processability.

Crosslinking is carried out using any one or more of the well known crosslinking systems for polyacrylate elastomers. Typical crosslinking systems consist of a soap (sodium or potassium stearate) which can be used with accelerators such as sulfur or sulfur donors or bases such as magnesium oxide or tertiary amines. Ammonium benzoate, ammonium adipate, and soap/quaternary amine systems are known to be effective cure systems as are red lead/ethylene thiourea and diamines and polyamines.

Polyacrylate elastomers are copolymers having two major components: the backbone, comprising 95–99 weight percent of the polymer; and the reactive cure-site, comprising 1–5 weight percent of the polymer. The copolymers have high molecular weights, typically around 100,000 Mv (viscosity average molecular weight). The backbones are made from monomeric acid esters to form repeating units of primarily two types

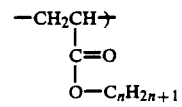

where n is 2 or 4 and

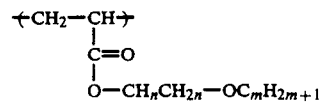

m is 1 or 2. The most common cure site monomers are 2-chloroethyl vinyl ether and allyl glycidyl ether.

Physically, polyacrylate elastomers are inherently soft and tacky. They commonly have relatively low Mooney viscosities [ML-1+4' 100° C.] in the 25–60 range.

EXAMPLES

General Procedures Used to Prepare Blends

The polymers to be mixed were charged to a preheated mixer (Haake Rheocord Model 600) equipped with cam-style blades. Mixer speed was maintained at 100 rpm during the mixing procedure. The polymers were mixed until their temperature reached that preset for the mixing chamber. The polymers were then mixed with or without added cross-linking agents for the times noted in the Examples. The temperature of the polymer blend usually rose above the preset temperature of the mixing chamber during mixing. A nitrogen atmosphere was maintained in the mixing chamber while the polymers were being mixed. The polymer blend was removed from the Haake mixer and allowed to cool. The polymer blend was then remixed as described in the Examples.

Polymer Test Methods

Test specimens were cut from slabs compression molded 40° C. above the temperature at which the polymers were blended. The test methods used were:

| | |
|---|---|
| Stress at 100% elongation at 8.5 mm/s | ASTM D412 |
| Tensile strength at break at 8.5 mm/s | ASTM D412 |
| Elongation at break at 8.5 mm/s | ASTM D412 |
| Compression set after 22 hr/ 70° C., method B | ASTM D395 |
| Volume swell in ASTM #3 oil | ASTM D471 |
| Shore hardness | ASTM D2240 |

Stress-strain measurements were run on test specimens approximately 0.6 mm in thickness. Specimens for oil-swell tests were cut from 1.9 mm thick slabs which were remolded from previously molded slabs in order to demonstrate the remoldability of the blends. Compression sets were measured using 13 mm discs died out of about 2 mm thick slabs and piled up to a thickness of about 13 mm.

Polymers Employed

The characteristics of the segmented polyetherester elastomers used to illustrate the invention are listed below:

| Polyetherester Elastomer | Name | Shore D Hardness | Specific Gravity | Melting Point (°C.) | Melt Flow Rate 2160 g Load (g/10) min. |
|---|---|---|---|---|---|
| A | "Hytrel" 4056 | 40 | 1.17 | 168 | 5.3 at 190° C. |
| B | "Hytrel" G4074 | 40 | 1.18 | 173 | 5.2 at 190° C. |
| C | "Hytrel" 5556 | 55 | 1.20 | 211 | 5.9 at 220° C. |
| D | "Hytrel" 7246 | 70 | 1.25 | 219 | 12.9 at 240° C. |

They are available commercially under the trademark "Hytrel" polyester elastomer.

The polyacrylate elastomers used to illustrate the invention are commercially available. Their characteristics are listed below:

| Polyacrylate Elastomer | Name | Specific Gravity | Mooney Viscosity ML 1 + 4 (100° C.) |
|---|---|---|---|
| A | Hycar ® 4051 | 1.10 | 40–60 |
| B | Cyanacryl ® R | 1.15 | 42–51 |

The polymers were dried before mixing for two hours at 120° C. under reduced pressure and a nitrogen atmosphere. Both Hycar ® 4051 and Cyanacryl ® R are based on ethyl acrylate.

EXAMPLE 1

A series of compositions was prepared from polyacrylate elastomer A and segmented polyetherester elastomer A. The compositions contained varying amounts of the two polymers. Cross-linking agents were added during mixing to effect cross-linking of the polyacrylate elastomer. The compositions were prepared by mixing the polymers together for 6 minutes in the Haake mixer preheated to 160° C., adding 2.14 parts of sodium stearate and 0.29 parts of Adogen 345-D (dimethyl hydrogenated tallow t-amine) per 100 parts of total polymer, and mixing for 8 minutes. The compositions were then mixed for about 3 minutes on a two-roll rubber mill heated to about 160° C. and finally for an additional 2 minutes in the Haake mixer at 160° C.

A second series of compositions was prepared containing the same polymers in the same ratios as the first series but with no cross-linking agents. This second series was prepared by mixing the polymers together for 14 minutes in the Haake mixer preheated to 160° C., mixing the resulting compositions for about 3 minutes on a two-roll rubber mill heated to about 160° C., and finally mixing for an additional 2 minutes in the Haake mixer at 160° C.

The polymer proportions and the properties of the two series of compositions are listed in Table 1. Those compositions labeled 2C–9C were prepared using cross-linking agents. Those compositions labeled 2N–9N were prepared without added cross-linking agents. Compositions 2C–9C and 2N–9N are illustrative of the present invention. Composition 1N is not a blend. It was not prepared in the mixer and it is included for comparison purposes only as it lies outside of the present invention.

Compositions 2C–9C and 2N–9N exhibit improved resistance to oil swell relative to composition 1N. Compositions 2N–4N, included in the preferred composition range with no cross-linking agents present, are lower in compression set and lower in hardness than composition 1N. Compositions 4C–9C, which include the preferred composition range with cross-linking agents added, are lower in compression set and lower in hardness than composition 1N and are lower in compression set than the analogous compositions 4N–9N with no cross-linking agents added.

TABLE 1

| Composition | Polyacrylate Elastomer A (wt. %) | Polyetherester Elastomer A (wt. %) | Compression Set (%) | ASTM #3 oil 7 Days/100° C. (% Vol. Swell) | Shore D Hardness | Tensile Strength (MPa) | Elongation at Break (%) |
|---|---|---|---|---|---|---|---|
| 1N | 0 | 100 | 78 | 28 | 39 | 32 | 855 |
| 2C | 10 | 90 | 66 | 25 | 41 | 24 | 865 |
| 2N | 10 | 90 | 62 | 23 | 38 | 33 | 895 |
| 3C | 20 | 80 | 64 | 23 | 38 | 15 | 630 |
| 3N | 20 | 80 | 67 | 22 | 35 | 21 | 810 |
| 4C | 30 | 70 | 60 | 22 | 35 | 14 | 565 |
| 4N | 30 | 70 | 65 | 21 | 34 | 15 | 800 |
| 5C | 40 | 60 | 52 | 20 | 31 | 13 | 425 |
| 5N | 40 | 60 | 71 | 20 | 29 | 10 | 710 |
| 6C | 50 | 50 | 42 | 19 | 28 | 12 | 395 |
| 6N | 50 | 50 | 72 | 19 | 25 | 6.1 | 705 |
| 7C | 60 | 40 | 36 | 17 | 23 | 11 | 350 |
| 7N | 60 | 40 | 78 | 18 | 19 | 4.0 | 700 |
| 8C | 70 | 30 | 27 | 16 | 20 | 9.0 | 300 |
| 8N | 70 | 30 | 95 | 17 | 13 | 1.1 | >1000 |
| 9C | 80 | 20 | 18 | 15 | 15 | 5.9 | 240 |
| 9N | 80 | 20 | 98 | 15 | 7 | <0.3 | >1000 |

EXAMPLE 2

As in Example 1, two series of compositions were prepared, one series with cross-linking agent added and one series without cross-linking agent. Polyacrylate elastomer A and polyetherester elastomer C were used. The compositions containing cross-linking agent were prepared by mixing the polymers together for 6 minutes at 100 rpm in the Haake mixer preheated to 215° C., adding 2.14 parts of sodium stearate per 100 parts of total polymer, and mixing for 6 minutes. The compositions were removed from the mixer and then recharged to the mixer preheated to 215° C. and mixed for 2 minutes at 100 rpm. The series of compositions without added cross-linking agent were prepared by mixing the polymers together for 14 minutes at 100 rpm in the Haake mixer preheated to 215° C., removing the compositions from the mixer, recharging the compositions to the mixer preheated to 215° C., and mixing for 2 minutes at 215° C.

The polymer proportions and the properties of the two series of compositions are listed in Table 2. Those compositions labeled 11C-18C were prepared using cross-linking agent. Those compositions labeled 11N-18N were prepared without cross-linking agent. Compositions 11C-18C and 11N-18N are illustrative of the present invention. Composition 10N is not a blend. It was not prepared in the mixer and it is included for comparison purposes only as it lies outside of the present invention.

Compositions 11C-18C and 11N-17N exhibit lower hardness and equivalent or lower oil swell than the composition 10N. Compositions 11N-13N, included in the preferred composition range with no cross-linking agent present, are lower in compression set than composition 10N. Compositions 13C-17C, which include the preferred composition range with cross-linking agent added, are lower in compression set than composition 10N and are higher in tensile strength and lower in compression set than the corresponding compositions 13N-17N without added cross-linking agent.

TABLE 2

| Composition | Polyacrylate Elastomer A (wt. %) | Polyetherester Elastomer C (wt. %) | Compression Set (%) | ASTM #3 oil 7 Days/100° C. (% Vol. Swell) | Shore D Hardness | Tensile Strength (MPa) | Elongation at Break (%) |
|---|---|---|---|---|---|---|---|
| 10N | 0 | 100 | 57 | 11 | 58 | 36 | 645 |
| 11C | 10 | 90 | 50 | 10 | 56 | 21 | 400 |
| 11N | 10 | 90 | 53 | 10 | 56 | 25 | 560 |
| 12N | 20 | 80 | 47 | 10 | 52 | 17 | 290 |
| 12C | 20 | 80 | 53 | 9 | 52 | 18 | 475 |
| 13C | 30 | 70 | 52 | 10 | 48 | 14 | 250 |
| 13N | 30 | 70 | 55 | 9 | 48 | 13 | 320 |
| 14C | 40 | 60 | 50 | 10 | 44 | 13 | 260 |
| 14N | 40 | 60 | 58 | 10 | 42 | 11 | 305 |
| 15C | 50 | 50 | 46 | 10 | 36 | 10 | 235 |
| 15N | 50 | 50 | 62 | 10 | 36 | 8.7 | 355 |
| 16C | 60 | 40 | 47 | 10 | 29 | 7.9 | 225 |
| 16N | 60 | 40 | 55 | 11 | 28 | 5.7 | 325 |
| 17C | 70 | 30 | 34 | 11 | 25 | 6.8 | 255 |
| 17N | 70 | 30 | 53 | 11 | 23 | 3.4 | 270 |
| 18C | 80 | 20 | 21 | 11 | 16 | 3.4 | 190 |
| 18N | 80 | 20 | 21 | — | 13 | 3.1 | 315 |

EXAMPLE 3

As in Example 1, two series of compositions were prepared, one series with cross-linking agents added and one series without cross-linking agents. Segmented polyetherester elastomer D and polyacrylate elastomer A were used. The compositions containing cross-linking agents were prepared by the same procedure as in Example 2 except that 2.14 parts of sodium stearate and 0.29 part of Adogen 345-D were added per 100 parts of total polymer and the mixing operations were carried out at 225° C. The series of compositions without added cross-linking agents were prepared as in Example 2 except that the mixing operations were carried out at 225° C.

The polymer proportions and the properties of the two series of compositions are listed in Table 3. Those compositions labled 20C-27C were prepared using cross-linking agents. Those compositions labeled 20N-27N were prepared without added cross-linking agents. Compositions 20C-27C and 20N-27N are illustrative of the present invention. Composition 19N is not a blend. It was not prepared in the mixer and it is included for comparison purposes only as it lies outside of the present invention.

Compositions 20C-27C and 20N-27N are all lower in hardness than compositions 19N. Compositions 20N-22N included in the preferred composition range with no cross-linking agents present are higher in elongation at break than the corresponding compositions 20C-22C with cross-linking agents. Compositions 20N and 21N, included in the preferred composition range with no cross-linking agents present, are lower in compression set than composition 19N. Compositions 20C-23C and 25C-27C are all lower in compression set than composition 19N. Compositions 22C-27C, which include the preferred composition range with cross-linking agents added, are all lower in compression set than the corresponding compositions 22N-27N without added cross-linking agents.

Compositions 28C-31C all exhibit low compression sets, low oil swells and low Shore D hardnesses.

TABLE 4

| Composition | Polyacrylate Elastomer B (wt. %) | Polyetherester Elastomer Type | Polyetherester Elastomer (wt. %) | Compression Set (%) | ASTM #3 oil 7 Days/100° C. (% Vol. Swell) | Shore D Hardness | Tensile Strength (MPa) | Elongation at Break (%) |
|---|---|---|---|---|---|---|---|---|
| 28C | 60 | A | 40 | 43 | 18 | 21 | 15 | 583 |
| 29C | 60 | B | 40 | 37 | 16 | 22 | 9.1 | 395 |
| 30C | 60 | C | 40 | 36 | 12 | 27 | 16 | 395 |
| 31C | 60 | D | 40 | 36 | 9.1 | 36 | 15 | 295 |

TABLE 3

| Composition | Polyacrylate Elastomer A (wt. %) | Polyetherester Elastomer D (wt. %) | Compression Set (%) | ASTM #3 oil 7 Days/100° C. (% Vol. Swell) | Shore D Hardness | Tensile Strength (MPa) | Elongation at Break (%) |
|---|---|---|---|---|---|---|---|
| 19N | 0 | 100 | 55 | 5.2 | 72 | 51 | 675 |
| 20C | 10 | 90 | 44 | 5.6 | 69 | 31 | 30 |
| 20N | 10 | 90 | 47 | 6.2 | 68 | 26 | 285 |
| 21C | 20 | 80 | 45 | 5.7 | 65 | 22 | 30 |
| 21N | 20 | 80 | 44 | 6.4 | 65 | 23 | 220 |
| 22C | 30 | 70 | 50 | 6.2 | 60 | 19 | 120 |
| 22N | 30 | 70 | 56 | 6.6 | 60 | 17 | 130 |
| 23C | 40 | 60 | 51 | 6.9 | 53 | 17 | 140 |
| 23N | 40 | 60 | 54 | 6.8 | 52 | 14 | 185 |
| 24C | 50 | 50 | 60 | 8.1 | 46 | 16 | 200 |
| 24N | 50 | 50 | 73 | 8.1 | 45 | 10 | 150 |
| 25C | 60 | 40 | 46 | 8.9 | 35 | 15 | 250 |
| 25N | 60 | 40 | 66 | 8.5 | 36 | 7.0 | 180 |
| 26C | 70 | 30 | 26 | 9.5 | 28 | 12 | 240 |
| 26N | 70 | 30 | 40 | 10 | 26 | 3.8 | 210 |
| 27C | 80 | 20 | 13 | 10 | 17 | 3.2 | 140 |
| 27N | 80 | 20 | 25 | 11 | 17 | 3.4 | 260 |

EXAMPLE 4

A series of compositions were prepared containing 60 parts of polyacrylate elastomer B and 40 parts of various segmented polyetherester elastomers. Cross-linking agents were added during preparation to effect crosslinking of the polyacrylate elastomer. Compositions 28C and 29C were prepared in the same manner as compositions 2C-9C of Example 1. Composition 31C was prepared in the same manner as compositions 20C-27C of Example 3. Composition 30C was prepared in the same manner as composition 31C except that mixing was carried out at 215° C. rather than 225° C.

I claim:
1. A thermoplastic composition comprising about 20-99 parts by weight total polymers of a thermoplastic multi-block copolyester elastomer melting above 100° C. consisting essentially of (A) repeating high melting point blocks comprising repeating short chain ester units having the formula

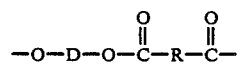

wherein D is a divalent radical remaining after removal of hydroxyl groups from a low molecular weight diol having a molecular weight not greater than 250 and R is a divalent radical remaining after the removal of carboxyl groups from a dicarboxylic acid having a molecular weight not greater than 300, D and R being selected so that a polymer which consists essentially of short chain ester units having a number average molecular weight of at least 5000 has melting points above 100° C., (B) repeating low melting point blocks which are derived from compounds containing hydroxyl or carboxyl groups or mixtures thereof having number average molecular weights of 400-4000 and melting points not greater than 100° C., and (C) an amount of difunctional radicals sufficient to join repeating blocks of (A) and (B) to form multi-block copolymer elastomers, the weight ratio of (A) to (B) being from about 1:4 to 1:0.1, and from 1-80 parts by weight total polymers of a polyacrylate elastomer consisting essentially of repeating units of the structures selected from

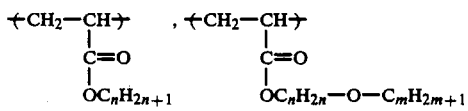

where n is 2 or 4 and m is 1 or 2 and up to 5 weight percent, based on polyacrylate elastomer, of a cure-site monomer.

2. The composition of claim 1 wherein the polyacrylate elastomer is not crosslinked and the composition contains about 70–99 parts by weight total polymers of multi-block copolyester elastomer and 30–1 parts by weight total polymers of polyacrylate elastomer.

3. The composition of claim 1 wherein crosslinking agent is present and crosslinking of the polyacrylate elastomer took place during mixing and shearing and said crosslinked polyacrylate elastomer is dispersed in the multi-block copolyester elastomer.

4. The composition of claim 3 comprising 30–70 parts by weight total polymers of a multi-block copolyester elastomer and 70–30 parts by weight total polymers of a polyacrylate elastomer.

5. The composition of claim 1 wherein the copolyester has high melting point blocks derived from ethylene glycol or 1,4-butanediol and terephthalic acid or mixtures thereof containing up to about 30% by weight isophthalic or phthalic acid.

6. The composition of claim 1 wherein the copolyester has low melting point blocks derived from poly(alkylene oxide) glycols having a carbon-to-oxygen ratio of about 2.0–4.3 and a number average molecular weight of from about 400–4000.

7. The composition of claim 6 wherein the poly(alkylene oxide) glycol is poly(tetramethylene oxide) glycol having a number average molecular weight of from about 600–2000.

8. The composition of claim 6 wherein the poly(alkylene oxide) glycol is ethylene oxide capped poly(propylene oxide) glycol having a number average molecular weight of 1500–2800 and an ethylene oxide content of 15–35% by weight.

9. The composition of claim 1 wherein the low melting point blocks are derived from polyester glycols.

10. The composition of claim 9 wherein the polyester glycol is poly(tetramethylene adipate) glycol or polycaprolactone glycol having a number average molecular weight of from 800–2500.

11. The composition of claim 2 wherein the polyacrylate elastomer is based on repeating units principally of the structure

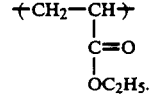

* * * * *